United States Patent [19]
Walberg

[11] Patent Number: 4,543,908
[45] Date of Patent: Oct. 1, 1985

[54] MATERIAL FOR FILTERING SPRAY COATING PARTICLES FROM AIR

[76] Inventor: Arvid C. Walberg, 4443 St. Tropez Dr., Lisle, Ill. 60532

[21] Appl. No.: 426,823

[22] Filed: Sep. 29, 1982

[51] Int. Cl.⁴ .......................... B05B 1/28; B05B 15/04
[52] U.S. Cl. ..................................... 118/326; 118/628
[58] Field of Search ............................... 118/628, 326

[56]  References Cited
U.S. PATENT DOCUMENTS

| | | | |
|---|---|---|---|
| 2,486,877 | 11/1949 | Ransburg et al. | 118/628 X |
| 2,509,276 | 5/1950 | Ransburg et al. | 118/628 |
| 4,388,370 | 6/1983 | Ellis et al. | 427/180 X |

FOREIGN PATENT DOCUMENTS 2841395  3/1980  Fed. Rep. of Germany ...... 118/628

Primary Examiner—Shrive P. Beck
Attorney, Agent, or Firm—Thomas A. Stansbury

[57]  ABSTRACT

A conductive filter material or cloth is utilized in spray booths, (1) to eliminate "bleed through" due to electrostatic force to grounded supporting structure, (2) to reduce clogging of the openings between the fibers of the filter material, and (3) to eliminate the possibility of arcing in low humidity and highly volatile solvent conditions.

1 Claim, 6 Drawing Figures

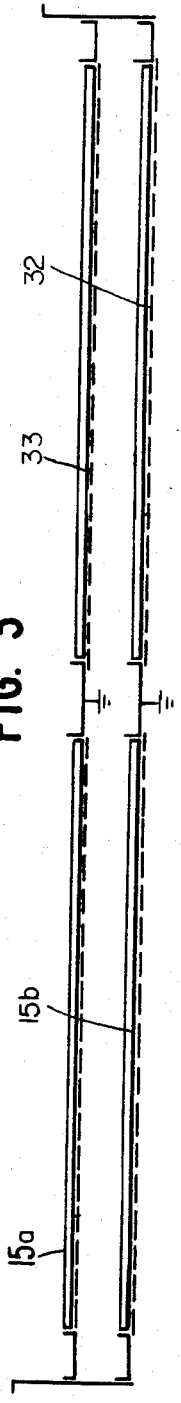
FIG. 3
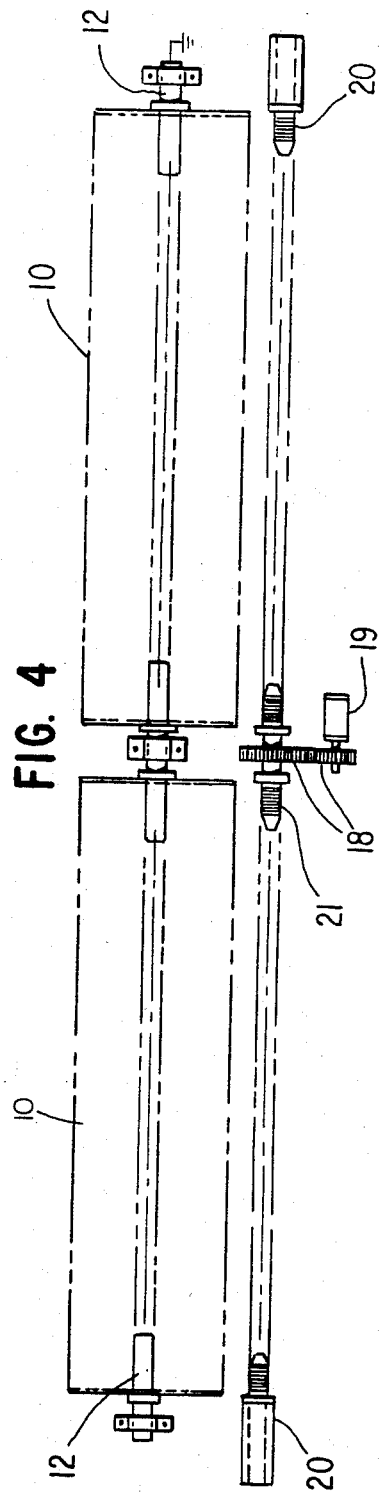
FIG. 4
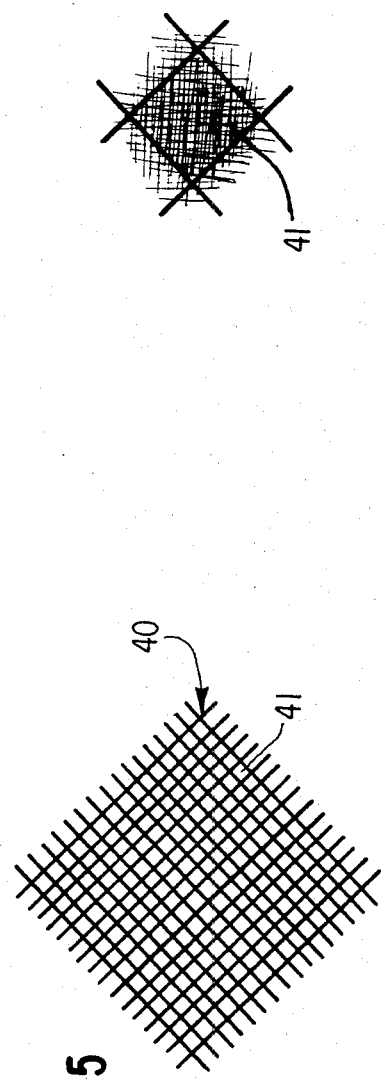
FIG. 6
FIG. 5

MATERIAL FOR FILTERING SPRAY COATING PARTICLES FROM AIR

BACKGROUND OF THE INVENTION

I Field of the Invention

The present invention relates to filters for trapping and collecting air-borne coating overspray which has been discharged from a coating spray gun or other application device and, more particularly, two filters utilized in spray coating booths having a movable wall of filter material.

II Description of the Prior Art

U.S. patent application Ser. No. 06/371412 filed Apr. 23, 1982, for process and apparatus for filtering spray coating particles from air, discloses a spray booth having a front movable wall composed of two layers of movable, flexible filter material supplied from a single continuous supplied roll and is incorporated by reference herein. The layers of filter material are composed of a mat of closely-spaced non-woven extruded polypropylene fibers forming a multiplicity of cells and randomly positioned non-woven polypropylene fibers extending from the mat into each said cell to provide sub-cells of sub-micron size openings. This filter cloth is non-conductive as were other filter cloths previously utilized in the industry, see U.S. Pat. No. 3,811,371, issued May 21, 1974, to Sheila Hardy.

Such non-conductive filter cloth allows electrically-charged paint to remain charged after it collects on the cloth. This charged paint is attracted towards grounded backup rollers or backup screens or grids in spray booths. The charged paint builds up opposite the rollers, grids or screens, and is sucked through the cloth electrostatically since the paint particles still carry a negative charge, this causes the rollers, grids, or screens to get wet and sticky with paint. When the paint dries, it causes the filter cloth to stick to the rollers, grids or screens and causes tearing of the cloth. When the filter tears, it is necessary to shut down the system to make repairs. This interferes with production and is quite costly.

SUMMARY OF THE INVENTION

I have discovered that by making the filter material or cloth electrically conductive, the charged paint particles are attracted to the material or cloth instead of the rollers, grids or screens behind the cloth. Electrically conductive cloth provides an electrical shield. It discharges the paint and prevents the paint from being drawn through the filter material or cloth electrostatically. Thus, the backup rollers, grids or screens remain much cleaner.

By using electrically conductive cloth, electrostatically charged paint particles are distributed on the cloth differently. Air flows toward the openings in the cloth while the spray particles veer off towards the grounded fibers of the material or cloth. This helps to keep the openings through the cloth open longer and avoids having them clogged up quickly. The filter will collect more paint before the system indexes. The system indexes new cloth into the booth. The filter consumption is reduced.

Another advantage is improved safety. Under low humidity conditions, static electricity builds up on the non-conductive cloth and can cause visible arcings. This could create a fire hazard under some solvent vapor concentrations. However this cannot occur when conductive filter material or cloth is utilized and it is grounded.

It is therefore an object of the present invention to provide a new and improved filter material for movable curtain filter spray booths.

Another object is to provide filter material that will attract electrically charged spray coating material in a uniform manner regardless of the position of grounded backup supporting structure.

An additional object is to provide a spray coating filter material wherein all of the fibers of the material are grounded to prevent charged spray coating particles from being drawn through them to grounded structure behind the material.

Yet another object is to improve safety in spray booths under low humidity conditions.

Further objects and advantages will become apparent from the following detailed description.

DESCRIPTION OF THE DRAWINGS

Further objects and advantages will become apparent from the following detailed description taken in conjunction with the accompanying drawings in which:

FIG. 3 is a cross-sectional drawing of the invention illustrated in FIG. 1, taken along the line 3—3 in FIG. 1;

FIG. 4 is a cross-sectional drawing taken along the line 4—4 in FIG. 2;

FIG. 5 is a 1.75 enlarged drawing of a square inch elevational section of the filter material utilized in the preferred embodiment of the invention; and FIG. 6 is a magnified cell of the cell illustrated in FIG. 5.

DESCRIPTION OF THE PREFERRED EMBODIMENT

While this invention is susceptible of embodiment in many different forms, there is described herein in detail an embodiment of the invention with the understanding that the present disclosure is to be considered as an exemplification of the principles of the invention and is not intended to limit the invention to the embodiment described. The scope of the invention will be pointed out in the attachment claims.

Figure 1:
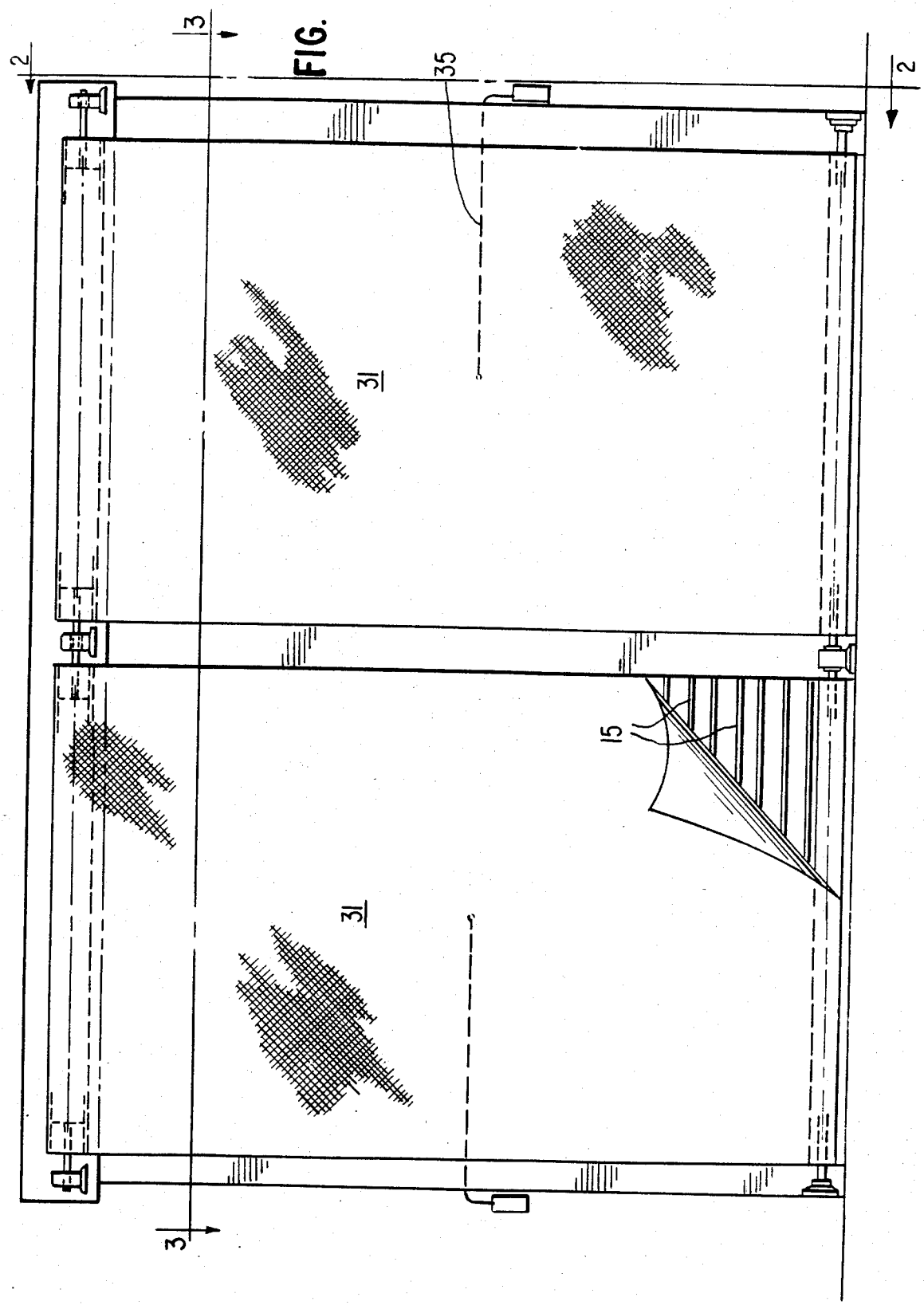
FIG. 1 is an elevation drawing of a preferred embodiment of the invention.
Figure 2:
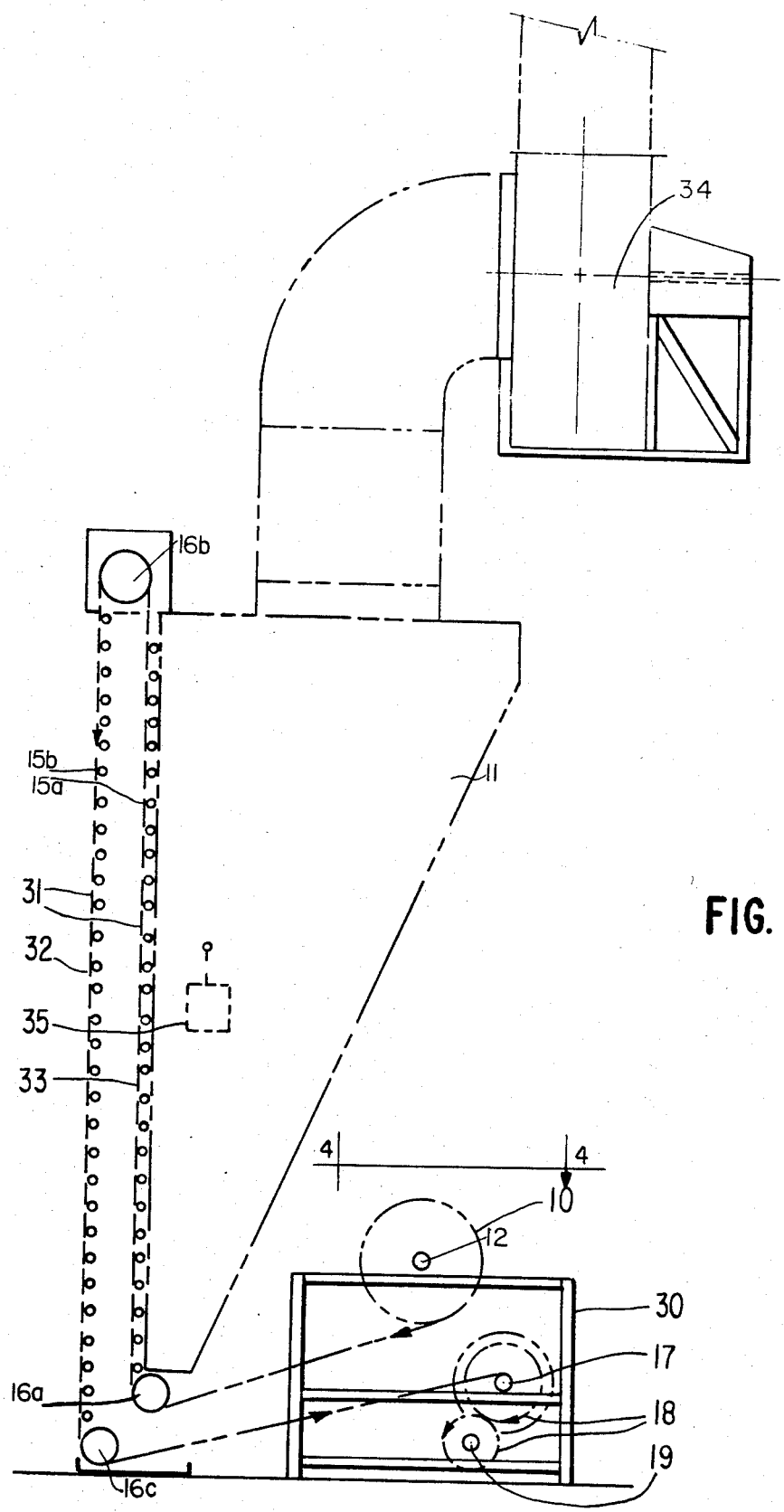
FIG. 2 is an elevational drawing of one end of the preferred embodiment illustrated in FIG. 1, taken along the line 2—2 in FIG. 1.

A double-layer filter curtain, as described in my co-pending patent application, Serial No. 06/371,412, is constructed of non-woven extruded polypropylene fibers formed as a mat or grid and then bonded together with heat and pressure. The construction of the mat comprises approximately 225 cells per square inch. Each cell in the mat has the fibers forming the cell spaced approximately 40 microns apart. The multiplicity of polypropylene fibers extend from the mat into each cell to form a great multiplicity of random sub-cells of sub-micron size. Referring to the embodiment of the invention illustrated in FIG. 1-4, 600 yard rolls 10 of fabric are loaded behind spray booth plenum 11 on "pay-out" shafts 12. The filter material is drawn around "idler" rollers 16a upwards through exhaust plenum 11 in front of back-up rollers 15a, around "idler" rollers 16a, downward in front of back-up rollers 15b, and around "idler" rollers 16c to "wind-up" tubes 17. The end of the filter rolls are affixed to the cardboard "wind-up" tubes 17 which are rotated with a set of gears 18 driven by an air motor 19. The "wind-up" tubes 17 are rotated by use of air-chucks 20 and 21 which are expanded during operation and then collapsed when "wind-up" tubes 17 have accumulated approximately 300 yards of used filter.

The "pay-out" shafts 12, "wind-up" tubes 17, air-chucks 20 and 21, drive gears 18 and air drive motor 19 are all mounted on a structural steel frame 30. A filter curtain generally indicated at 31 forms a double layer of fabric 32 and 33 which becomes the face or front wall of the sheet metal exhaust plenum. An exhaust fan 34, designed not to exceed 80 decibels, provides necessary air velocity and volume to draw air-borne particles into curtain 31.

A manometer 35 positioned behind the curtain in plenum is adjusted to detect reduced air flow through filter media, due to paint accumulation, and energize a solenoid valve (not shown) which will provide compressed air to the air (drive) motor 19 thus indexing gears 18 to wind up used filter and provide clean filter material.

The rollers 16*a, b* and *c* and back-up rollers 15*a* and *b* are electrically conductive and grounded.

Referring now to FIGS. 5 and 6, the double layer filter curtain or wall 31 is constructed of non-woven extruded polypropylene fibers formed as a mat or grid 40 and then bonded together with heat and pressure. The construction of The mat provides approximately 225 cells per square inch, as illustrated in FIG. 5. FIG. 5 is 1.75× actual size of a mat. Thus each cell in the mat, such as cell 41, has the fibers forming the cell spaced approximately 40 microns apart.

Referring now to FIG. 6 specifically, the typicaly "40 micron size" cell 41 is magnified to more clearly show a multiplicity of polypropylene fibers extending from the mat into the cell 41 to form a great multiplicity of random sub-cells of sub-micron size.

The majority of air-borne paint particles are in the range of 5 to 200 microns in size and are entrapped on the polypropylene fibers. The sub-micron cell openings continue to allow air flow through the fabric.

The majority of air-borne paint particles are in the range of 5 to 200 microns in size and are entrapped on the polypropylene fibers. A liquid conductive coating is prepared utilizing a low-humidity conductive coating such as HSC Corporation's Formula ECC No. 519, Isopropyl Alcohol, and water, in the following proportions:

| | |
|---|---|
| HSC's ECC No. 519 | 320 cc |
| Isopropyl Alcohol | 2 pints |
| Water | 8 gallons |

The polypropylene curtain is provided in rolls and is fed through a roller coater filled with the aforestated conductive coating mixture so that the conductive solution is applied to one side of the filter cloth. Although the cloth is treated on one side only, the liquid conductive mixture will penetrate through the cloth with the aid of the improved wetting characteristic supplied by the Isopropyl Alcohol.

It is not necessary to dry the filter material after treatment and before the material is rolled up.

The cloth is normally indexed in steps so that fresh cloth is periodically started through the two layers of curtain from the roll of conductive filter material.

Since the backup rollers are metal and are grounded, their contact with the conductive cloth will ground the individual fibers in the cloth. As charged spray particles from overspray approach the conductive cloth curtain, they will see a uniform grounded shield and therefore deposit themselves in a uniform manner over that shield which is the exposed face of the cloth curtain instead of being drawn to areas of the cloth which have grounded structure behind them. As the charged spray coating particles impinge upon the fibers in the exposed face of the conductive filter cloth, they will be discharged and will no longer be attracted to any structure behind the cloth and will not be drawn through the cloth by electrostatic force as occurs in prevous movable curtain spray booths. A more even distribution occurs. With a greater tendency of the spray coating particles to attach themselves to the fibers towards the exposed face of the curtain, air flows towards the openings in the cloth while the spray particles veer off toward the grounded fibers of the cloth. As aforementioned, this keeps the openings through the cloth open longer.

Since the spray particles are discharged as soon as they impinge upon fibers at or near the exposed face of the cloth, no charge is built up on the cloth which could cause visible arcing to other grounded structure. Therefore any possibility of a fire hazard in such spray booths is eliminated.

While a preferred embodiment has been described in detail, those skilled in the art will recognize that modifications and variations may be made which are within the scope of the present invention. For example, the liquid conductive coating may be applied to both sides of the material instead of just one side, and the amount of Isopropyl Alcohol could be simultaneously reduced or eliminated. The conductive liquid coating material can be applied to other filter cloth materials such as those described in U.S. Pat. Nos. 2,841,073; 2,875,680; 3,071,060, 3,201,272; and 3,729,147. Further, all such non-conductive filter cloth can be treated as taught herein and utilized for any of the backup structures described in my co-pending application and in the aforestated five U.S. patents, as well as other filter booth constructions. All such modifications and variations are intended to be within the scope of the appended claims.

I claim:

1. A spray booth comprising:

(a) a moveable wall having a continuous flexible mat of closely spaced fibers forming a multiplicity of cells, (b) a multiplicity of randomly positioned fibers extending from the mat into each said cell with a multiplicity of random sub-cells, (c) a conductive coating covering said mat and randomly positioned fibers, (d) a conductive backup structure supporting said continuous flexible mat, and (e) means connected to said continuous mat to electrically ground said continuous flexible mat and said conductive backup structure.

* * * * *